No. 784,255. Patented March 7, 1905.

UNITED STATES PATENT OFFICE.

ISAAC R. EDMANDS AND JOSEPH SCALES, OF SAULT STE. MARIE, MICHIGAN, ASSIGNORS TO UNION CARBIDE COMPANY, OF NIAGARA FALLS, NEW YORK, A CORPORATION OF VIRGINIA.

PROCESS OF UTILIZING SCALE FROM CALCIUM-CARBID INGOTS.

SPECIFICATION forming part of Letters Patent No. 784,255, dated March 7, 1905.

Application filed December 22, 1904. Serial No. 238,027.

*To all whom it may concern:*

Be it known that we, ISAAC R. EDMANDS and JOSEPH SCALES, citizens of the United States, residing at Sault Ste. Marie, in the county of Chippewa and State of Michigan, have invented certain new and useful Improvements in Processes of Utilizing Scale from Calcium-Carbid Ingots, of which the following is a specification.

The scale which is removed from ingots of calcium carbid produced in the Horry and other commercial electric furnaces is a refuse product. Attempts have been made to utilize this scale by crushing it and resmelting it in the electric furnace or adding it to the normal furnace-charge mixture of lime and carbon. The results have been unsatisfactory, since the scale contains a considerable amount, usually about twenty per cent., by weight, of calcium carbid and the moisture in the atmosphere and raw material reacts on the carbid in the ground scale while in the supply hoppers and chutes, producing acetylene and an explosive mixture of acetylene and air. Furthermore, the presence of carbid and graphite, as well as unconverted lime and carbon, in the scale gives it a very low and irregular electrical conductivity, so that it is commercially impracticable to resmelt it in the usual manner.

According to the present process the carbid-scale is preferably subdivided and treated with sufficient water to decompose the carbid therein. The residue is then dried and smelted in the usual carbid-furnace, sufficient carbon preferably being added to make the total carbon contents of the mixture equivalent to its lime contents.

In practice it is desirable to crush the scale into small pieces and to effect the decomposition of the contained carbid in an acetylene-gas generator, which is provided with agitators to insure contact between each particle of the scale and the water. The gas is collected and utilized. The water is driven off from the residue by means of any suitable drier. The residue when mixed with sufficient carbon may be directly smelted or may be added to the normal furnace charge of lime and carbon.

We claim—

1. The process of utilizing the scale from calcium-carbid ingots, which consists in decomposing the carbid therein, and smelting the residue, as set forth.

2. The process of utilizing the scale from calcium-carbid ingots, which consists in decomposing the carbid therein by the action of water, and drying and smelting the residue, as set forth.

3. The process of utilizing the scale from calcium-carbid ingots, which consists in decomposing the carbid therein, mixing carbon with the residue, and smelting the mixture, as set forth.

4. The process of utilizing the scale from calcium-carbid ingots, which consists in decomposing the carbid therein by the action of water, drying the residue and mixing it with carbon, and smelting the mixture, as set forth.

5. The process of utilizing the scale from calcium-carbid ingots, which consists in subdividing the scale, decomposing the carbid therein, and smelting the residue, as set forth.

6. The process of utilizing the scale from calcium-carbid ingots, which consists in subdividing the scale, decomposing the carbid therein by the action of water, and drying and smelting the residue, as set forth.

7. The process of utilizing the scale from calcium-carbid ingots, which consists in subdividing the scale, decomposing the carbid therein, mixing carbon with the residue, and smelting the mixture, as set forth.

8. The process of utilizing the scale from calcium-carbid ingots, which consists in subdividing the scale, decomposing the carbid therein by the action of water, drying the residue and mixing it with carbon, and smelting the mixture, as set forth.

In testimony whereof we affix our signatures in presence of two witnesses.

ISAAC R. EDMANDS.
JOSEPH SCALES.

Witnesses:
F. E. LAWTON,
JNO. WHITE.